US008657593B2

(12) United States Patent
Sagawa

(10) Patent No.: US 8,657,593 B2
(45) Date of Patent: Feb. 25, 2014

(54) SINTERED MAGNET PRODUCTION SYSTEM

(75) Inventor: Masato Sagawa, Kyoto (JP)

(73) Assignees: Intermetallics Co., Ltd., Kyoto (JP); Mitsubishi Corporation, Toyota (JP)

( * ) Notice: Subject to any disclaimer, the term of this patent is extended or adjusted under 35 U.S.C. 154(b) by 0 days.

(21) Appl. No.: 12/810,620

(22) PCT Filed: Dec. 22, 2008

(86) PCT No.: PCT/JP2008/003877

§ 371 (c)(1),
(2), (4) Date: Jun. 25, 2010

(87) PCT Pub. No.: WO2009/084178

PCT Pub. Date: Jul. 9, 2009

(65) Prior Publication Data

US 2010/0266718 A1 Oct. 21, 2010

(30) Foreign Application Priority Data

Dec. 28, 2007 (JP) ................................ 2007-339359

(51) Int. Cl.
*B29C 43/56* (2006.01)

(52) U.S. Cl.
USPC ................. 425/3; 425/78; 425/234; 425/338; 249/126

(58) Field of Classification Search
USPC ................ 425/3, DIG. 33, 233, 234, 338, 78; 249/126
See application file for complete search history.

(56) References Cited

U.S. PATENT DOCUMENTS 4,370,112 A * 1/1983 Sorbier ............................ 425/3
5,672,363 A * 9/1997 Sagawa et al. .................... 425/3
(Continued)

FOREIGN PATENT DOCUMENTS

CN 1647220 A 7/2005
CN 1969347 A 5/2007
(Continued)

OTHER PUBLICATIONS

International Preliminary Report on Patentability issued in Patent Application No. PCT/JP2008/003877, on Aug. 10, 2010 (with translation).

(Continued)

*Primary Examiner* — Richard Crispino
*Assistant Examiner* — Thukhanh Nguyen
(74) *Attorney, Agent, or Firm* — Oliff PLC

(57) ABSTRACT

The present invention is aimed at providing a sintered magnet production system that can prevent the influences of a leaking magnetic field in an orienting process. A sintered magnet production system according to the present invention has a filling means 11 for filling an alloy powder into a filling/sintering container, a sintering means 13 for sintering the alloy powder, and an orienting means 12 with an air-core coil for producing a magnetic field for orienting the alloy powder in the filling/sintering container after the filling process and before the sintering process, the axis of the air-core coil being displaced from a straight line connecting the filling means 11 and the sintering means 13. The magnetic field leaking from the orienting means 12 is strongest on the extended line of the axis of the air-core coil and relatively weak in the direction perpendicular to the extended line. By displacing the axis of the air-core coil from the aforementioned straight line, the magnetic field leaking from the orienting means 12 is weakened at the positions of the filling means 11 and the sintering means 13, so that a magnet with high characteristics can be obtained.

12 Claims, 3 Drawing Sheets

(56) References Cited

U.S. PATENT DOCUMENTS

| | | | | |
|---|---|---|---|---|
| 6,352,598 | B1 | 3/2002 | Hisamura et al. | |
| 6,779,995 | B2 * | 8/2004 | Kohara et al. | 425/78 |
| 7,014,440 | B2 * | 3/2006 | Okumura et al. | 425/3 |
| 7,347,681 | B2 * | 3/2008 | Ugai et al. | 425/78 |
| 2002/0020470 | A1 | 2/2002 | Okumura et al. | |
| 2005/0208164 | A1 | 9/2005 | Ugai et al. | |
| 2007/0245851 | A1 * | 10/2007 | Sagawa et al. | 249/117 |

FOREIGN PATENT DOCUMENTS

| | | | |
|---|---|---|---|
| DE | 100 22 717 | A1 | 1/2001 |
| DE | 101 31 638 | A1 | 1/2002 |
| EP | 0 488 334 | A2 | 6/1992 |
| EP | 0 646 937 | A1 | 4/1995 |
| JP | A-59-46008 | | 3/1984 |
| JP | A-06-096973 | | 4/1994 |
| JP | A-7-132399 | | 5/1995 |
| JP | A-09-129463 | | 5/1997 |
| JP | A-2005-226108 | | 8/2005 |
| JP | A-2005-232475 | | 9/2005 |
| JP | A-2006-19521 | | 1/2006 |
| WO | WO 03/092020 | A1 | 11/2003 |

OTHER PUBLICATIONS

International Search Report issued in Patent Application No. PCT/JP2008/003877, on Apr. 7, 2009 (with translation).

Extended European Search Report issued in European Application No. 08868621.7 dated Mar. 15, 2011.

May 18, 2012 Office Action issued in Taiwan Patent Application No. 97150192 (with translation).

Feb. 22, 2012 Office Action issued in Chinese Patent Application No. 200880118720.0 w/translation.

Mar. 27, 2012 Office Action issued in Japanese Patent Application No. 2007-339359 w/translation.

Nov. 13, 2012 Office Action issued in Chinese Patent Application No. 200880118720.0 (with translation).

Dec. 18, 2012 Office Action issued in Japanese Patent Application No. 2007-339359 (with translation).

Apr. 28, 2013 Office Action issued in Chinese Patent Application No. 200880118720.0 (with translation).

Oct. 1, 2013 Office Action issued in Japanese Patent Application No. 2013-054772 (with translation).

* cited by examiner

SINTERED MAGNET PRODUCTION SYSTEM

TECHNICAL FIELD

The present invention relates to a system for producing a sintered magnet made of a sintered body, such as a rare-earth/iron/boron magnet (RFeB magnet) or rare-earth/cobalt (RCo magnet).

BACKGROUND ART

An RFeB magnet, which was discovered by Sagawa (the inventor of the present invention) et al. in 1982, is characterized in that its properties are far superior to those of the previously used permanent magnets and yet it can be produced from relatively abundant, inexpensive materials, i.e. neodymium (a rare-earth element), iron and boron. Due to these merits, this magnet is currently used in various products, such as the voice coil motors for hard disk drives or similar devices, drive motors for hybrid cars or electric ears, motors for battery-assisted bicycles, industrial motors, high-quality speakers, head phones, and magnetic resonance imaging (MRI) apparatuses using permanent magnets.

The main phase of the RFeB magnet is an $R_2Fe_{14}B$ intermetallic compound, which has a tetragonal crystal structure and possesses magnetic anisotropy (Patent Document 1). Improving the magnetic characteristics of the RFeB magnet requires making use of this magnetic anisotropy. For this reason, it is produced by a sintering process, by which a dense, uniform and fine structure can be obtained.

A sintering process is normally performed as follows: After an alloy powder of an RFeB magnet is filled into a mould, a magnetic field is applied to the alloy powder, while a pressure is applied with a pressing machine, to simultaneously perform both the molding and orientation processes. Then, the molded body is removed from the mould and heated to be sintered. Patent Document 2 discloses a different method for producing an RFeB sintered magnet; the method includes filling an alloy powder of an RFeB magnet into a filling/sintering container (filling process), orienting the alloy powder within a magnetic field without the press-molding operation (orienting process), and directly heating the powder (sintering process). By this method, an RFeB magnet having even higher magnetic characteristics can be obtained since the press-molding operation, which disorders the oriented state of the alloy powder, is omitted.

Patent Document 2 also discloses a sintered magnet production system including a closed container having an inner space maintained in an oxygen-free or inert-gas atmosphere, within which a filling means, an orienting means and a sintering means are provided, and a transfer means is also provided for transferring a filling/sintering container from the filling means to the orienting means as well as from the orienting means to the sintering means. This system can handle the alloy powder in the oxygen-free or inert-gas atmosphere throughout the entire process, thereby preventing the oxidation of the product and the deterioration of its magnetic characteristics.

Patent Document 1: Japanese Unexamined Patent Application Publication No. S59-046008

Patent Document 2: Japanese Unexamined Patent Application Publication No. 2006-019521

DISCLOSURE OF THE INVENTION

Problem to be Solved by the Invention

The production of sintered magnets is performed by a flow process; the filling, orienting and sintering operations are performed in parallel. Particularly, since the orienting means requires applying a strong magnetic field having a magnetic flux density of a few tesla, it is difficult to prevent the leakage of the magnetic field from the orienting means. The leaking magnetic field produces a force that acts on the alloy powder, thereby disordering the oriented state of the alloy powder in the sintered means or interfering with the operation of filling the alloy powder by the filling means.

One possible method for removing these influences of the leaking magnetic fields is to provide long distances between the orienting means and the sintering means as well as between the orienting means and the filing means. However, this design inevitably increases the size of the production system. Such an increase in the entire size of the system requires a larger installation space. Furthermore, the closed container needs to be accordingly enlarged, which increases the cost for maintaining the oxygen-free or inert-gas atmosphere.

In the foregoing explanation, an RFeB magnet, which is especially susceptible to oxidation, was taken as an example. However, even if the magnet to be produced is relatively resistant to oxidation and hence it is unnecessary to use the closed container, there remains the problem that the system occupies a large space.

Thus, the problem to be solved by the present invention is to provide a sintered magnet production system that can prevent the influences of a leaking magnetic field in an orienting process.

Means for Solving the Problems

A sintered magnet production system according the present invention aimed at solving the aforementioned problems is characterized by including:

a) a filling means for filling an alloy powder into a filling/sintering container;

b) an orienting means having an air-core coil for orienting the alloy powder in the filling/sintering container by means of a magnetic field;

c) a sintering means for sintering the alloy powder; and d) a transfer means for transferring the filling/sintering container to the filling means, the orienting means and the sintering means in this order, where e) the orienting means is arranged so that the axis of the air-core coil is displaced from the straight line connecting the filling means and the sintering means.

The magnetic field leaking from the air-core coil is strongest on the extended line of the axis of the air-core coil and relatively weak around the axis. Therefore, when the filling means, the orienting means and the sintering means are arranged in a straight line, the filling means and the sintering means are strongly affected by the leaking magnetic field. By contrast, in the present invention, the axis of the air-core coil is displaced from the straight line connecting the filling means and the sintering means, so that the leaking magnetic field at the positions of the filling means and the sintering means is weaker than in the case of the straight-line arrangement, The orienting means may be arranged so that the axis of the air-core coil is directed away from the aforementioned straight line. Particularly, it is preferable to define the axis of the air-core coil to be orthogonal to this straight line. It is also possible to arrange the axis of the air-core coil parallel to and displaced from the straight line.

The transfer means may include a main transfer means for transferring the filling/sintering container along a main transfer line connecting the filling means and the sintering means, and a sub transfer means for transferring the filling/sintering container along a sub transfer line connecting a predetermined point on the main transfer line and the orienting means.

It is preferable that the filling means and the orienting means be contained in one closed container and this closed container communicate with the sintering means.

The orienting means may be a coil wound around a portion of the external wall of the closed container.

Effects of the Invention

By the present invention, the strength of the magnetic field leaking from the orienting means can be suppressed at the positions of the filling means and the sintering means. Therefore, the oriented state of the alloy powder in the sintering means will not be disordered, and the operation of filling the alloy powder by the filling means will not be interfered with.

Since the filling means and the sintering means are displaced from the extended line of the axis of the air-core coil, on which the leaking magnetic field is strongest, it is possible to bring the filling means and the sintering means closer to the orienting means than in the case where those means are on the aforementioned extended line. Therefore, the system can be smaller in size. When the closed container is used, its volume can be reduced with the size reduction of the system to decrease the usage of the inert gas and suppress the running cost.

EXPLANATION OF NUMERALS

0, 20, 30 . . . Sintered Magnet Production System
11, 21, 31 . . . Filling Means
111 . . . Powder Supply Means
112 . . . Leveling Means
113 . . . Vibrating Means
114 . . . Tapping Means
12, 22, 32 . . . Orienting Means
121, 221 . . . Air-Core Coil
13, 23, 33 . . . Sintering Means
14, 24, 34 . . . Transfer Means
141 . . . Main Transfer Line
142 . . . Sub Transfer Line
143 . . . Intermediate Point
15, 25, 35 . . . Closed Container
151 . . . Projected Portion
152 . . . Outer Wall
241 . . . Main Transfer Means
242 . . . Sub Transfer Means
26 . . . Outer Container Setting Means
261 . . . Filling/Sintering Container Elevator
262 . . . Guide
263 . . . Outer Container Holder
51 . . . Range of Leakage of Magnetic Field
52 . . . Filling/Sintering Container
53 . . . Outer Container

BEST MODES FOR CARRYING OUT THE INVENTION

Embodiments of the sintered magnet production system according to the present invention is hereinafter describes by means of FIGS. 1 to 4.

First Embodiment

Figure 1:
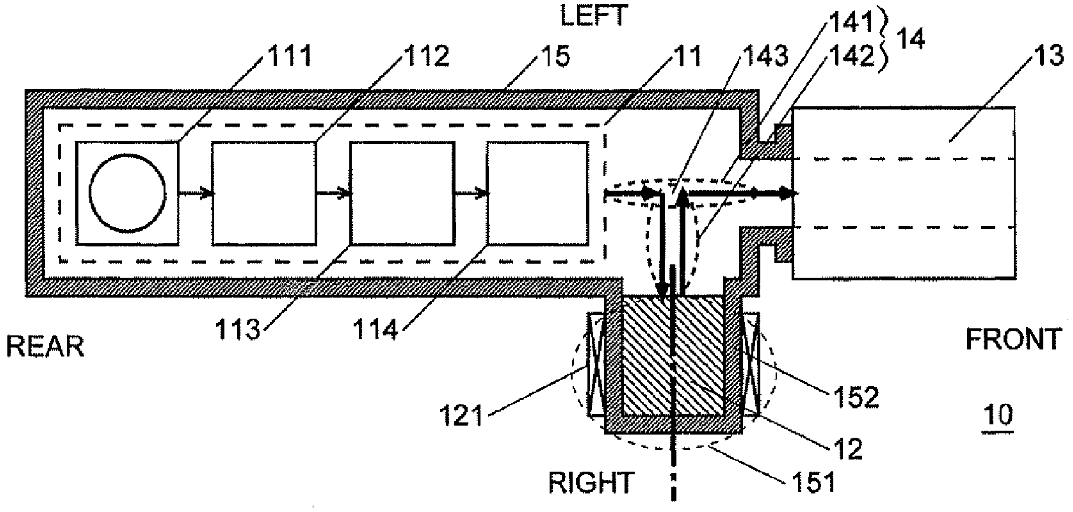
FIG. 1 is a top view showing the schematic configuration of the first embodiment of the sintered magnet production system according to the present invention.

The first embodiment 10 of the sintered magnet production system according to the present invention is shown in FIG. 1. This sintered magnet production system 10 has a filling means 11 for filling an alloy powder into a filling/sintering container, an orienting means 12 for orienting the alloy powder filled in the filling/sintering container, and a sintering means 13 for sintering the alloy powder after the powder is oriented. The orienting means 12 is located at a position displaced from a straight line connecting the filling means 11 and the sintering means 13. The sintered magnet production system 10 further has a transfer means 14 for transferring a filling/sintering container. Furthermore, the system 10 also has a closed container 15 holding the filling means 11, the orienting means 12, the sintering means 13 and the transfer means 14 in an oxygen-free or inert-gas atmosphere. Hereinafter, these means are respectively described in detail.

The filling means 11 is provided with a powder supply means 111 for supplying an alloy powder into a filling/sintering container, a leveling means 112 for leveling a heap of the alloy powder supplied in the filling/sintering container, a vibrating means 113 for vibrating the alloy powder by an air vibrator after the filling/sintering container is closed with a lid, and a tapping means 114 for impacting the alloy powder by smashing the filling/sintering container onto a table. By the vibrating means 113 and the tapping means 114, the alloy powder can be densely filled without a pressing process. For example, a fine powder of an NdFeB magnet with an average grain size of 3 micrometers can be filled to a density of 3.5 to 4.0 g/cm$^3$.

The orienting means 12 is at a position which is substantially on the same plane that the filling means 11 and the sintering means 13 are located on, but is displaced from the straight line connecting the latter two; specifically, the position is laterally separated from an intermediate point 143 between the filling means 11 and the sintering means 13 along a line perpendicular to the aforementioned straight line. Allowing for this design, the closed container 15 has a projected portion 151 corresponding to the orienting means 12. The orienting means 12 has an air-core coil 121 for generating a magnetic field. The axis of the air-core coil 121 extends in a direction (i.e. the direction indicated by the long dashed short dashed line in the figure) perpendicular to the straight line connecting the filling means 11 and the sintering means 13. The air-core coil 121 is wound around the outer wall 152 of the projected portion 151. That is, the outer wall 152 serves as the coil bobbin. Using the outer wall 152 as the coil bobbin in this manner enables the air-core coil to have a smaller inner diameter and create a stronger magnetic field than in the case of providing a separate coil bobbin around the outer wall 152.

The sintering means 13 consists of a heating furnace for heating the filling/sintering container in the same state as it is transferred from the orienting means 12. The inner space of the heating furnace communicates with the closed container 15, so that both the heating furnace and the closed container 15 can be maintained in the oxygen-free or inert-gas atmosphere. An insulation door (not shown) is provided between the heating furnace and the closed container 15. During the heating process, this door can be closed to suppress the temperature rise inside the closed container 15 as well as to maintain the oxygen-free or inert-gas atmosphere within the heating furnace only.

The transfer means 14 has a main transfer line 141 for transferring the filling/sintering container from the filling means 11 via the intermediate point 143 to the sintering means 13, and a sub transfer line 142 for transferring the filling/sintering container between the intermediate point 143 and the orienting means 12 in a direction perpendicular to the main transfer line 141. As the transfer means 14, a belt conveyer made of a non-magnetic resin or similar material is used to avoid affecting the alloy powder in the oriented state.

An operation of the sintered magnet production system 10 of the present embodiment is hereinafter described, taking the case of producing an NdFeB sintered magnet as an example.

First, the filling/sintering container is moved to the powder supply means 111 inside the sintering means 11. The powder supply means 111, which has a weigher, supplies a predetermined amount of NdFeB alloy powder from a hopper into the filling/sintering container. Next, the alloy powder piled in the filling/sintering container is leveled with the leveling means 112. After the filling/sintering container is closed with a lid, the alloy powder is vibrated by the vibrating means 113 and subsequently impacted by the tapping means 114. By these operations using the vibrating means 113 and the tapping means 114, the density of the alloy powder in the filling/sintering container is increased to a level of 3.5 to 4.0 g/cm$^3$.

Next, the transfer means 14 transfers the filling/sintering container from the filling means 11 via the intermediate point 143 to the orienting means 12. While the filling/sintering container is set within the air core of the coil 121, the orienting means applies a pulsed magnetic field of 3 to 8 T to the alloy powder. The fine particles of the alloy powder experience a force from this magnetic field, which rotates and orients the particles so that their axes of easy magnetization are aligned.

It should be noted that this orienting process is essentially different from the magnetization process performed on many kinds of sintered magnets by applying a magnetic field to a sintered body. As just described, the orienting process is for moving the fine particles by a force from the magnetic field, whereas the magnetization process is for aligning the direction of the electron spins without moving the fine particles. Accordingly, the magnetization process is performed after the sintering process, while the orienting process is performed before the sintering process so that the fine particles can be moved.

After the orienting process, the transfer means 14 transfers the filling/sintering container from the orienting means 12 via the intermediate point 143 to the sintering means 13. The sintering means 13 sinters the alloy powder in the filling/sintering container by heating it to temperatures of 950° to 1050° C. while maintaining the powder in the oriented state (i.e. without applying any load, such as a pressure). Thus, an NdFeB sintered magnet is obtained.

The present system sequentially produces many magnets by a flow process. Therefore, while performing the orienting process on the alloy powder in a filling/sintering container in the orienting means 12, the system simultaneously carries out the other processes, i.e. the process of filling the alloy powder into another filling/sintering container in the filling means 11 and the process of sintering the alloy powder in yet another filling/sintering container in the sintering means 13.

Figure 2:
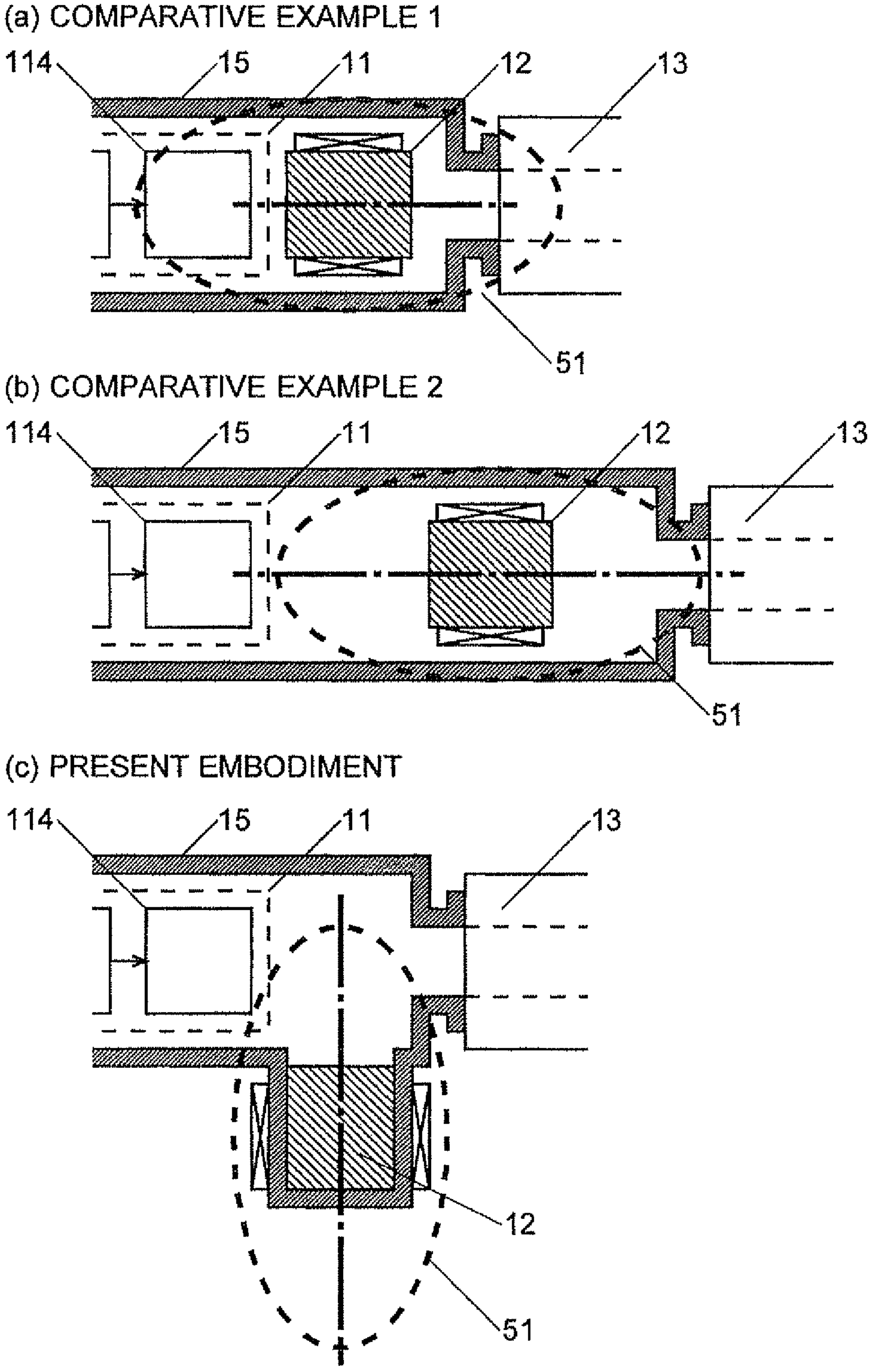
FIG. 2 is a schematic view showing the leakage range of the magnetic field from an orienting means 12 in the sintered magnet production systems of (a) the first comparative example, (b) the second comparative example and (c) the first embodiment.

Hereinafter, the influence of a magnetic field leaking from the air-core coil in the sintered magnet production system 10 of the present embodiment and comparative examples is described by means of FIG. 2. The magnetic field leaking from the air-core coil is strongest on the extended line of the axis of the air-core coil and relatively weak around this axis. Therefore, the range within which the leaking magnetic field is so strong as to influence the alloy powder in the filling/sintering container (this range is hereinafter called the "magnetic field leakage area 51") has an approximately elliptical shape, as shown in FIG. 2, with its major axis lying on the axial direction of the air-core coil. Therefore, if the orienting means 12 is arranged in such a manner that the axis of the air-core coil extends along the line connecting the filling means 11 and the sintering means 13 (first example, FIG. 2(*a*)), the magnetic field leakage area 51 will include the filling means 11 and the sintering means 13, causing unfavorable effects, such as magnetizing the other filling/sintering containers being simultaneously processed in the filling means 11 and the sintering means 13 or disordering the oriented alloy powder in those containers. On the other hand, if the filling means 11 and the sintering means 13 are separated from the orienting means 12 by a long distance to prevent those unfavorable effects (second example, FIG. 2(*b*)), the system will be larger in size, requiring a more installation space and increasing the cost of producing the oxygen-free or inert-gas atmosphere.

By contrast, in the sintered magnet production system 10 of the present embodiment, the axis of the air-core coil 121 is perpendicular to the straight line connecting the filling means 11 and the sintering means 13; neither the filling means 11 nor the sintering means 13 is present on the extended line of the axis of the air-core coil (FIG. 2(*c*)). As a result, the filling means 11 and the sintering means 13 are excluded from the magnetic field leakage area 51, so that no influence occurs on the orientation of the alloy powder and it is unnecessary to increase the system size.

Second Embodiment

Figure 3:
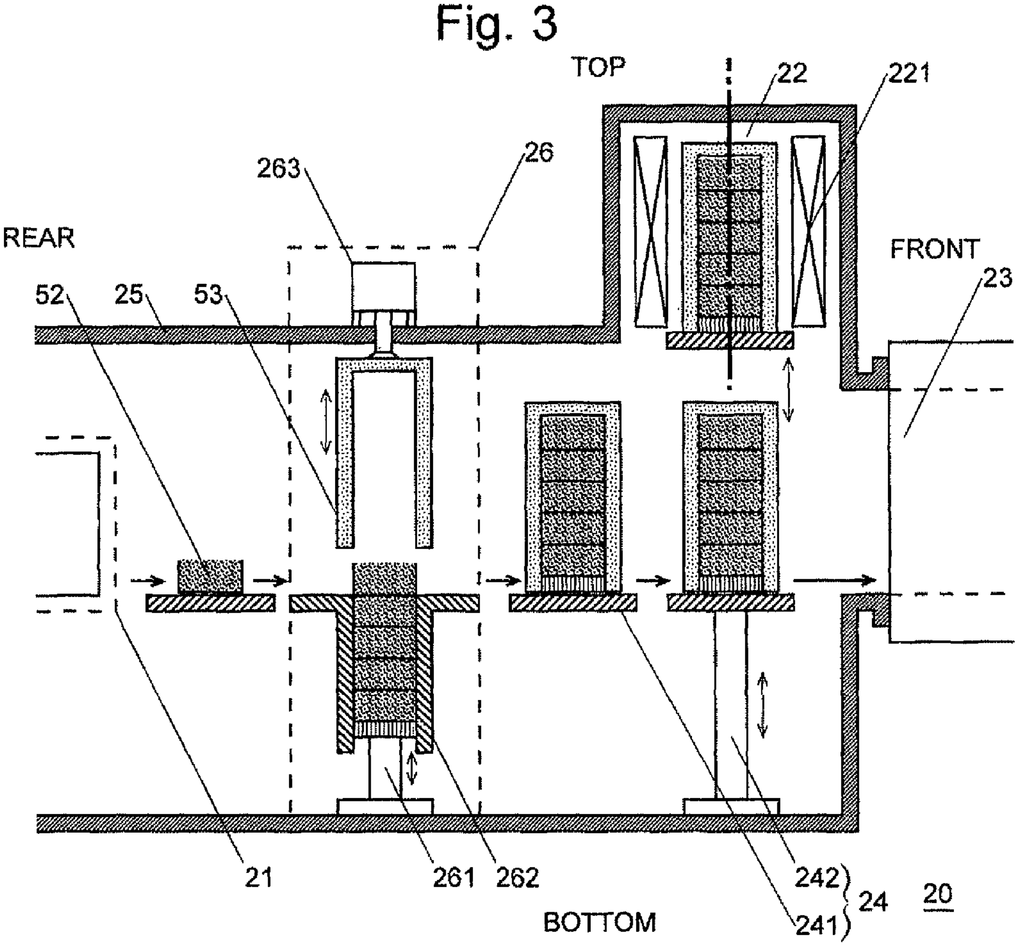
FIG. 3 is a side view showing the schematic configuration of the second embodiment of the sintered magnet production system according to the present invention.

The second embodiment of the sintered magnet production system 20 according to the present invention is shown in FIG. 3. The sintered magnet production system 20 includes a filling means 21, an outer container setting means 26, an orienting means 22, a sintering means 23 and a transfer means 24. These means are contained in a closed container 25. The filling means 21, the sintering means 23 and the closed container 25 are identical to those used in the first embodiment. Therefore, the following description will be focused on the outer container setting means 26, the transfer means 24 and the orienting means 22.

The outer container setting means 26 is a mechanism for setting filling/sintering containers 52 into an outer container 53. It includes a filling/sintering container lift 261, a guide 261 and an outer container holder 263. The outer container 53 is a container for holding a stack of filling/sintering containers 52. The filling/sintering container lift 261 receives one filling/sintering container 52 after another and creates a stack of filling/sintering containers 52 by lowering the stack by the container's height every time one filling/sintering container 52 filled with an alloy powder is transferred from the filling means 21. The guide 262 laterally supports the stacked filling/sintering containers 52. After a predetermined number of filling/sintering containers 52 have been stacked, the filling/sintering container lift 261 raises the stack of filling/sintering containers 52. In conjunction with this motion, the outer container holder 263 horizontally moves the outer container 53 to a position where the opening at the lower end of the outer container 53 is directly above the filling/sintering containers 52, and then lowers the outer container 53. As a result of these operations of the filling/sintering container lift 261 and the outer container holder 263, the stacked filling/sintering containers 52 are set into the outer container 53.

The transfer means 24 has a main transfer means 241 for horizontally transferring the filling/sintering containers 52 and the outer container 53 from the filling means 21 via the outer container setting means 26. It also has a sub transfer means 242, which is provided between the outer container setting means 26 and the sintering means 23, for vertically transferring the outer container 53, with the filling/sintering containers 52 held therein, between the main transfer means 241 and the orienting means 22. Similar to the first embodiment, a belt conveyer composed of non-metallic parts can be used as the main transfer means 241. As the sub transfer means 242, a lift similar to the filling/sintering container lift 261 can be used.

The orienting means 22, which is located directly above the sub transfer means 242, has an air-core coil 221 with a vertically extending axis (the long dashed short dashed line in the figure). As stated earlier, the outer container 53 is transferred by the sub transfer means 242 so as to be set into or removed from the air core of this coil 221. In the example of FIG. 3, the coil is provided inside the closed container 25. Alternatively, as in the first embodiment, the coil may be wound around the corresponding portion of the closed container.

An operation of the sintered magnet production system 20 of the present embodiment is hereinafter described. Similar to the first embodiment, the filling means 21 fills the filling/sintering container 52 with a measured amount of alloy powder by a powder supply means, after which the leveling means, the vibrating means and the tapping means are operated to compact the alloy powder to a high density of 3.5 to 4.0 g/cm$^3$. The transfer means 24 sequentially transfers the filling/sintering containers 52 filled with the alloy powder at high densities to the outer container setting means 26. The outer container setting means 26 sets the filling/sintering containers 52 into the outer container 53 in the previously described manner. Next, the transfer means 24 transfers the outer container 53 into the air-core coil of the orienting means 22 by the main transfer means 241 and the sub transfer means 242. Then, the orienting means 22 vertically applies a pulsed magnetic field of 3 to 8 T to the alloy powder in the filling/sintering containers 52 to orient the alloy powder. Subsequently, the transfer means 24 transfers the outer container 53 to the sintering means 23, which sinters the alloy powder by heating it to temperatures of 950° to 1050° C. while maintaining the powder in the oriented state. Thus, an NdFeB sintered magnet is obtained.

The sintered magnet production system 20 of the present embodiment enables a further reduction in the installation area since the orienting means 22 is provided above the transfer means 24. Furthermore, since this system simultaneously performs the orienting process on a plurality of filling/sintering containers 52, the influence of the magnetic field on the areas other than the orienting means 22 can be further suppressed.

In the present example, the orienting process is simultaneously performed on a plurality of filling/sintering containers 52 by using the outer container setting means 62. Even in the case where each filling/sintering container 52 is individually subjected to the orienting process, the vertically moving sub transfer means 242 in the present embodiment can be preferably used to achieve the aforementioned effect, i.e. to further reduce the installation area.

Third Embodiment

Figure 4:
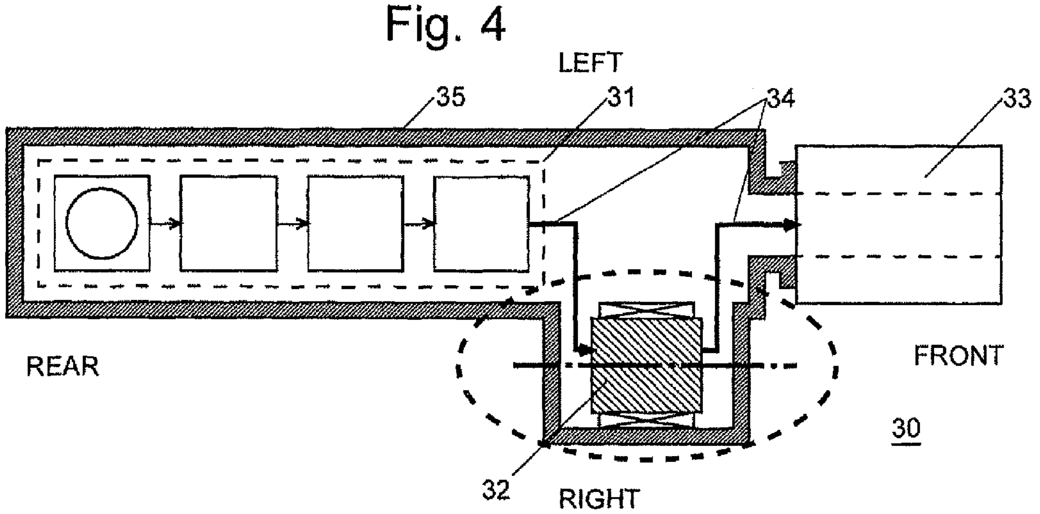
FIG. 4 is a top view showing the schematic configuration of the third embodiment of the sintered magnet production system according to the present invention.

The third embodiment 30 of the sintered magnet production system according to the present invention is shown in FIG. 4. The sintered magnet production system 30 of the present embodiment has a filling means 31, a sintering means 33 and a closed container 35, which are all identical to those of the first embodiment. The orienting means 32 is constructed similar to that of the second embodiment but arranged differently; the coil axis (the long dashed short dashed line in the figure) of the orienting means 32 is parallel to and displaced from the straight line connecting the filling means 31 and the sintering means 33. As a result of arranging the orienting means 32 in this manner, the filling means 31 and the sintering means 33 are excluded from the magnetic field leakage area 51 of the orienting means 32. The transfer means 34 transfers the filling/sintering container from the filling means 31 via the orienting means 32 to the sintering means 33 along a nonlinear path according to the position of the orienting means 32. Except for this operation of the transfer means 34, the sintered magnet production system 30 of the present embodiment operates in the same manner as the sintered magnet production system 10 of the first embodiment

The invention claimed is:

1. A sintered magnet production system, comprising:

a) a filling means for filling an alloy powder into a filling/sintering container;

b) an orienting means having an air-core coil for orienting the alloy powder in the filling/sintering container by means of a magnetic field while the filling/sintering container is positioned within the air-core coil;

c) a sintering means for sintering the alloy powder; and d) a transfer means for transferring the filling/sintering container to the filling means, the orienting means and the sintering means in this order, wherein e) the orienting means is arranged so that neither the filling means nor the sintering means is present on an axis of the air-core coil.

2. The sintered magnet production system according to claim 1, wherein the transfer means includes a main transfer means for transferring the filling/sintering container along a main transfer line connecting the filling means and the sintering means, and a sub transfer means for transferring the filling/sintering container along a sub transfer line connecting a predetermined point on the main transfer line and the orienting means.

3. The sintered magnet production system according to claim 2, wherein the sub transfer line is a line for vertically moving the filling/sintering container.

4. The sintered magnet production system according to claim 1, wherein the filling means and the orienting means are contained in one closed container and this closed container communicates with the sintering means.

5. The sintered magnet production system according to claim 4, wherein the orienting means is a coil wound around a portion of an external wall of the closed container.

6. The sintered magnet production system according to claim 1, wherein the orienting means simultaneously performs an orienting process on a plurality of filling/sintering containers after these filling/sintering containers are transferred from the filling means.

7. The sintered magnet production system according to claim 6, wherein an outer container setting means for setting a plurality of the filling/sintering containers into an outer container is provided between the filling means and the orienting means.

8. The sintered magnet production system according to claim 1, wherein the sintering means comprises a heating furnace for heating the alloy powder in the filling/sintering container.

9. The sintered magnet production system according to claim 1, wherein the sintering means supplies heat to the alloy powder in the filling/sintering container.

10. The sintered magnet production system according to claim 1, wherein the axis of the air-core coil is directed away from a straight line connecting the filling means and the sintering means.

11. The sintered magnet production system according to claim 10, wherein the axis of the air-core coil is orthogonal to the straight line.

12. The sintered magnet production system according to claim 1, wherein the axis of the air-core coil is parallel to a straight line connecting the filling means and the sintering means.

* * * * *